UNITED STATES PATENT OFFICE.

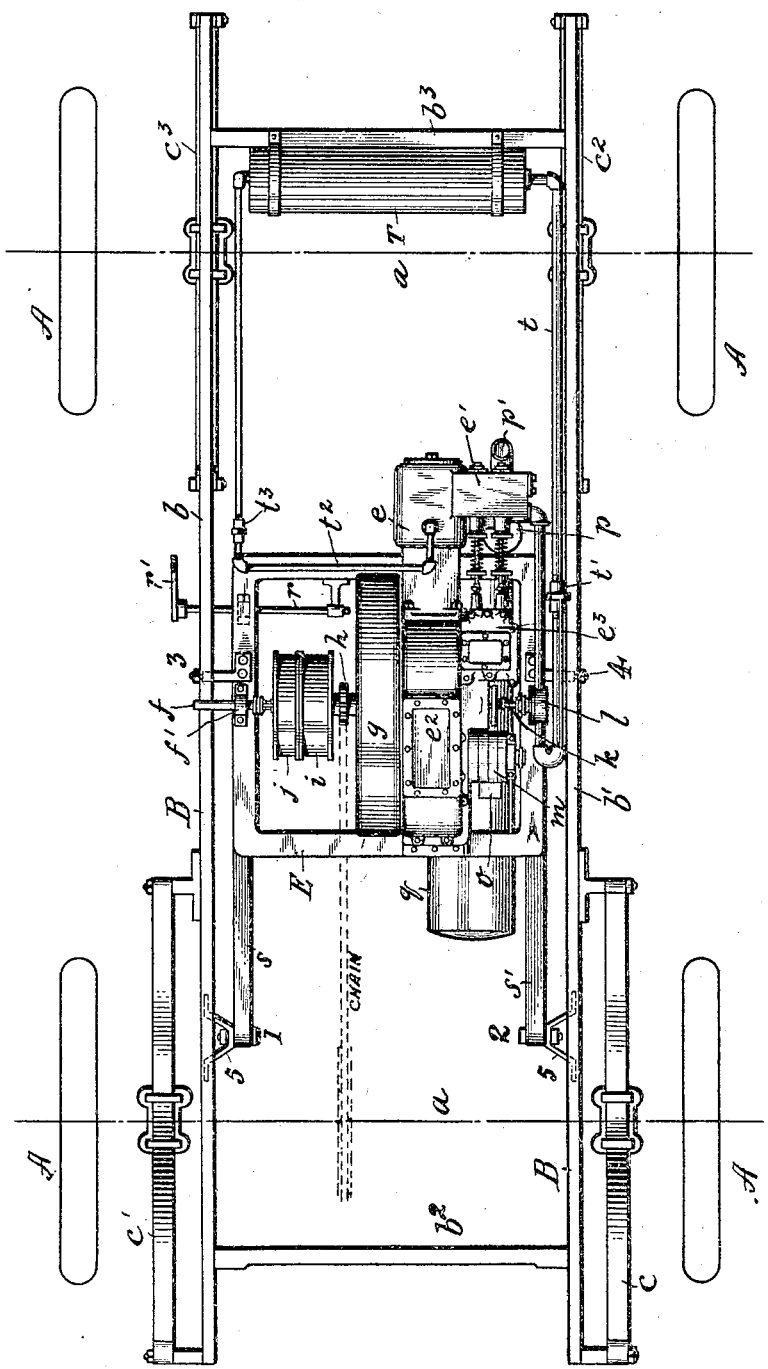

EDWARD R. HEWITT, OF NEW YORK, N. Y.

MOUNTING FOR POWER APPARATUS FOR SELF-PROPELLED VEHICLES.

No. 800,915.     Specification of Letters Patent.     Patented Oct. 3, 1905.

Application filed April 8, 1904. Serial No. 202,275.

*To all whom it may concern:*

Be it known that I, EDWARD R. HEWITT, a citizen of the United States, residing at the city of New York, in the borough of Manhattan and State of New York, have invented certain new and useful Improvements in Mounting for Power Apparatus of Self-Propelled Vehicles, of which the following is a full, clear, and exact description.

This invention relates to self-propelling vehicles, the object being to provide a mounting for the various elements of the power machinery which will make it possible to bodily remove all of the power machinery as one piece of apparatus from the vehicle quickly and by a very simple operation, whereby the making of repairs is facilitated. In instances where a large number of vehicles are in use as delivery-wagons or passenger-transportation vehicles the defective machinery of any particular vehicle can thus be quickly removed and perfect machinery substituted to avoid the disadvantage of putting the entire vehicle out of service.

In carrying out my invention I mount the power apparatus of the vehicle in a special and supplemental frame designed particularly to receive it and then mount this frame in or upon the main frame of the vehicle in such a manner that it can be removed therefrom by easily-detachable couplings. In the present instance I show the machinery-frame secured to the main frame by four bolts, by removing which the machinery can be lifted and removed from the frame at once. The advantage of such a construction is obvious.

For a more specific description of the invention reference is made to the accompanying drawing, in which the figure is a plan of an automobile-frame upon which is supported the propelling machinery in the manner contemplated by my invention.

Referring to the drawing by letter, A indicates the four wheels of the vehicle, the axes of which are indicated by the dotted lines $a$. B is the main frame of the vehicle, consisting in this case of a rectangular structure made up of channel metal and having the two side lengths $b$ $b'$ and the two cross-pieces $b^2$ and $b^3$. This frame is supposed to directly support the body of the vehicle, which may rest thereon and be attached in any suitable manner, the body not, however, being shown in the drawing. The frame is supported upon the axles by the rear springs $c$ and $c'$ and the forward springs $c^2$ and $c^3$.

E is a supplemental frame of a generally rectangular shape and made of channel or L metal. This frame has mounted upon it almost the entire power plant of the vehicle. It carries, in fact, all of the moving parts and many of the stationary parts. The water-tank used for cooling purposes and the gasolene-tank supplying the fuel are preferably not mounted on this frame, as they are pieces of apparatus which seldom require repairs, and therefore seldom if ever have to be removed from the vehicle. They are not, strictly speaking, parts of the propelling mechanism. For this reason alone they are placed upon the main frame; but it is obvious that, if desired, these tanks may also be located upon the supplemental frame. Upon the frame E is supported a horizontal explosion-engine, of which $e$ is the cylinder, surrounded by its water-jacket, $e'$ the valve-casing, $e^2$ the crank-casing, and $e^3$ the casing containing the cams for operating the valves. $f$ is the main shaft, which passes transversely through the crank-casing $e^2$ and has its bearings in the walls of said casing and on the frame E at the point $f''$, the frame of the engine being firmly secured directly to said frame E. Upon the main shaft there is a fly-wheel $g$, the driving-chain pinion $h$, the change-speed-gear box $i$, and the clutch-pulley $j$. Attached to and in line with the main shaft is an extension-shaft $k$, which drives the water-pump $l$, the latter being mounted upon frame E. $m$ indicates a magneto-generator bolted to a portion of the crank-casing, and $o$ a box attached to the side of the magneto and supposed to contain a spark-coil, these two devices being used as ordinarily for the purpose of igniting the explosive mixture in the engine-cylinder. $p$ is the carbureter attached to the under side of the valve-casing or directly to the frame E, $p'$ being the air-pipe leading thereto. $q$ is the muffler mounted upon or suspended from the frame E beneath the other mechanism described, as shown. $r$ is a shaft mounted in suitable bearings on the frame E and projecting to one side of the vehicle, where it carries the lever $r'$, by which the movements and speed of the vehicle are controlled. This shaft is supposed to operate a band-brake passing over the gear-box $i$ and the clutch $j$, the details of such mechanism being omitted. This supplemental frame E is preferably arranged between the axles and is attached to the main frame B by means of four bolts 1, 2, 3, and 4, respectively, which engage brackets on the main frame in such a manner as to be quickly removable. The location of the bolts 3 and 4 is as near as possible to the center of motion or vibration of the frame E, so that such jolting and jarring as the vehicle may be subjected to in use will be communicated to the slightest possible extent to the frame carrying the power mechanism. A line connecting the bolts 3 and 4 may therefore be understood as the turning center of the vertical movements of frame E. To still further protect the power apparatus from jarring, I attach spring extension-pieces $s$ and $s'$ to the frame E and carry them rearward a short distance to the location of the brackets 5, which receive the bolts 1 and 2, the bolts passing through the extremities of these extension-pieces. It will be seen that this construction provides for a cushioning of such rocking motions of the frame E as occur on its axis 3 4; but it is not essential to my invention that these extension-pieces be used; neither is it essential to the broad idea of my invention that the bolts 3 and 4 be placed at the center of motion of the frame. The four connecting-bolts may be placed at the four corners of the frame or at any other locations desired.

At the front of the vehicle I show a water-tank T, which in practice will be supplemented by the usual cellular or other water cooling apparatus. From this tank a pipe $t$, containing a union $t'$, leads to the pump $l$ and thence to the jacket around the valve-casing $e'$ and the cylinder $e$. From the latter jacket a pipe, containing a union $t^3$, leads back to tank T. The gasolene or other fuel tank may be supported in a manner quite similar to that in which the water-tank is supported and placed at any convenient location on the main frame with the usual connection to the carbureter, which connection should also contain a union.

With a vehicle constructed in this manner it is apparent that the entire power apparatus can be bodily removed from the vehicle by simply removing the bolts 1, 2, 3, and 4, disconnecting the water and gasolene pipes by means of the unions with which they are supplied, and then lowering the entire frame or raising it from the main frame B. Thus any part of the apparatus that requires repairs is easily accessible without dismantling or disassembling the various elements from each other. Also in testing machinery before it is mounted in a vehicle this united structure will be found convenient to handle.

In the operation of delivery-wagons or passenger-transportation vehicles this feature is of special value, since by having on hand at the garage a few extra sets of the power machinery the vehicles that come in with defective power machinery can be again sent out at once by substituting a perfect set of power machinery for the imperfect set.

Having described my invention, I claim—

1. In a self-propelling vehicle, the combination with a main frame supported upon the axles, of a supplemental frame carrying substantially all of the power apparatus and pivoted to the main frame upon an axis approximately coincident with its center of motion upon the main frame.

2. In a self-propelling vehicle, the combination of a main frame supported upon the axles, of a supplemental frame upon which is mounted substantially all of the power apparatus, said supplemental frame being connected with the main frame at four points, two of which are pivotal points located in the axis of motion of the supplemental frame and the other two points both being located on the same side of said axis.

3. In a self-propelled vehicle, the combination with a main frame supported upon the axles, of a supplemental frame carrying the power apparatus and pivoted to the main frame upon an axis approximately coincident with its center of motion upon the main frame, and a spring extending beyond the supplemental frame on each side and connected with the main frame at its ends.

In witness whereof I subscribe my signature in presence of two witnesses.

EDWARD R. HEWITT.

Witnesses:
 FRANK S. OBER,
 WALDO M. CHAPIN.